United States Patent
Olson et al.

(10) Patent No.: US 11,226,439 B2
(45) Date of Patent: Jan. 18, 2022

(54) SYSTEM AND METHOD FOR FORMING SURFACE RELIEF GRATINGS

(71) Applicant: APPLIED Materials, Inc., Santa Clara, CA (US)

(72) Inventors: Joseph C. Olson, Beverly, MA (US); Ludovic Godet, Sunnyvale, CA (US); Costel Biloiu, Rockport, MA (US)

(73) Assignee: APPLIED Materials, Inc., Santa Clara, CA (US)

( * ) Notice: Subject to any disclaimer, the term of this patent is extended or adjusted under 35 U.S.C. 154(b) by 111 days.

(21) Appl. No.: 16/228,205

(22) Filed: Dec. 20, 2018

(65) Prior Publication Data

US 2020/0150325 A1    May 14, 2020

Related U.S. Application Data

(60) Provisional application No. 62/758,171, filed on Nov. 9, 2018.

(51) Int. Cl.
*G02B 5/18*      (2006.01)
*G02B 6/136*     (2006.01)

(52) U.S. Cl.
CPC ......... *G02B 5/1857* (2013.01); *G02B 5/1861* (2013.01)

(58) Field of Classification Search
None
See application file for complete search history.

(56) References Cited

U.S. PATENT DOCUMENTS

| 5,116,461 A * | 5/1992 | Lebby ................. G02B 5/1857 204/192.34 |
| 6,490,089 B1 * | 12/2002 | Fabiny ................ G02B 5/1809 359/569 |
| 9,738,968 B2 | 8/2017 | Gammel et al. |
| 10,598,832 B2 * | 3/2020 | Evans ................. G02B 5/1857 |
| 10,684,407 B2 * | 6/2020 | Mohanty ............. G02B 6/0016 |
| 10,775,158 B2 * | 9/2020 | Olson .................... G01B 11/22 |
| 2009/0084757 A1 * | 4/2009 | Erokhin ............. H01J 37/3053 216/66 |
| 2015/0034591 A1 * | 2/2015 | Vink .................... G02B 5/1852 216/24 |
| 2015/0214099 A1 * | 7/2015 | Grenouillet ......... H01L 21/3065 438/424 |
| 2016/0035539 A1 * | 2/2016 | Sainiemi ............ B81C 1/00547 204/298.36 |
| 2019/0095201 A1 * | 3/2019 | Kimura ............... G06F 9/30032 |
| 2019/0258008 A1 * | 8/2019 | Hautala .................... G02B 6/34 |

* cited by examiner

*Primary Examiner* — Shamim Ahmed

(74) *Attorney, Agent, or Firm* — Kacvinsky Daisak Bluni PLLC

(57) ABSTRACT

Optical grating components and methods of forming are provided. In some embodiments, a method includes providing a substrate, and etching a plurality of trenches into the substrate to form an optical grating. The optical grating may include a plurality of angled trenches, wherein a depth of a first trench of the plurality of trenches varies between at least one of the following: a first lengthwise end of the first trench and a second lengthwise end of the first trench, and between a first side of the first trench and a second side of the first trench.

11 Claims, 6 Drawing Sheets

SYSTEM AND METHOD FOR FORMING SURFACE RELIEF GRATINGS

CROSS-REFERENCE TO RELATED APPLICATION

The present application claims priority to U.S. Provisional Patent Application No. 62/758,171 filed Nov. 9, 2018, entitled "System and Method for Forming Surface Relief Gratings," and incorporated by reference herein in its entirety.

FIELD

The present disclosure relates to optical elements, and more particularly to approaches for forming surface relief gratings.

BACKGROUND

Optical elements such as optical lenses have long been used to manipulate light for various advantages. Recently, micro-diffraction gratings have been utilized in holographic and augmented/virtual reality (AR and VR) devices. One particular AR and VR device is a wearable display system, such as a headset, arranged to display an image within a short distance from a human eye. Such wearable headsets are sometimes referred to as head mounted displays, and are provided with a frame displaying an image within a few centimeters of the user's eyes. The image can be a computer generated image on a display, such as a micro display. The optical components are arranged to transport light of the desired image, where the light is generated on the display to the user's eye to make the image visible to the user. The display where the image is generated can form part of a light engine, so the image generates collimated light beams guided by the optical component to provide an image visible to the user.

Different kinds of optical components have been used to convey the image from the display to the human eye. To properly function in an augmented reality lens or combiner, the geometries of an optical grating may be designed to achieve various effects. In some devices, multiple different regions, such as two or more different regions, are formed on the surface of a lens, wherein the grating geometries in one region are different from the grating geometries in other regions.

Angled surface relief optical gratings can be produced by the direct etching of angled trenches into a substrate or a film stack on a substrate. One of the parameters controlling the efficiency of the optical grating is the trench depth. Current techniques of forming complicated trenches involve multiple cycles of litho-etching, resulting in increased cost and decreased throughput.

Therefore, with respect to at least the above drawbacks the present disclosure is provided.

SUMMARY

According to embodiments of the disclosure, a method of forming an optical grating component may include providing a substrate, and etching a plurality of trenches into the substrate to form an optical grating. A depth of a first trench of the plurality of trenches may vary between at least one of the following: a first lengthwise end of the first trench and a second lengthwise end of the first trench, and between a first side of the first trench and a second side of the first trench.

According to embodiments of the disclosure, a system may include an ion source operable to deliver an ion beam to a substrate, and an optical grating formed into the substrate. The optical grating may include a plurality of trenches, wherein a depth of a first trench of the plurality of trenches varies between at least one of the following: a first lengthwise end of the first trenches and a second lengthwise end of the first trench, and between a first side of the first trench and a second side of the first trench.

According to embodiments of the present disclosure, a method of forming an optical grating component may include providing a substrate, and etching a plurality of trenches into the substrate to form an optical grating. A depth of a first trench of the plurality of trenches may vary between at least one of the following: a first lengthwise end of the first trench and a second lengthwise end of the first trench, and between a first side of the first trench and a second side of the first trench.

BRIEF DESCRIPTION OF THE DRAWINGS

The accompanying drawings illustrate exemplary approaches of the disclosure, including the practical application of the principles thereof, as follows.

Figure 1:
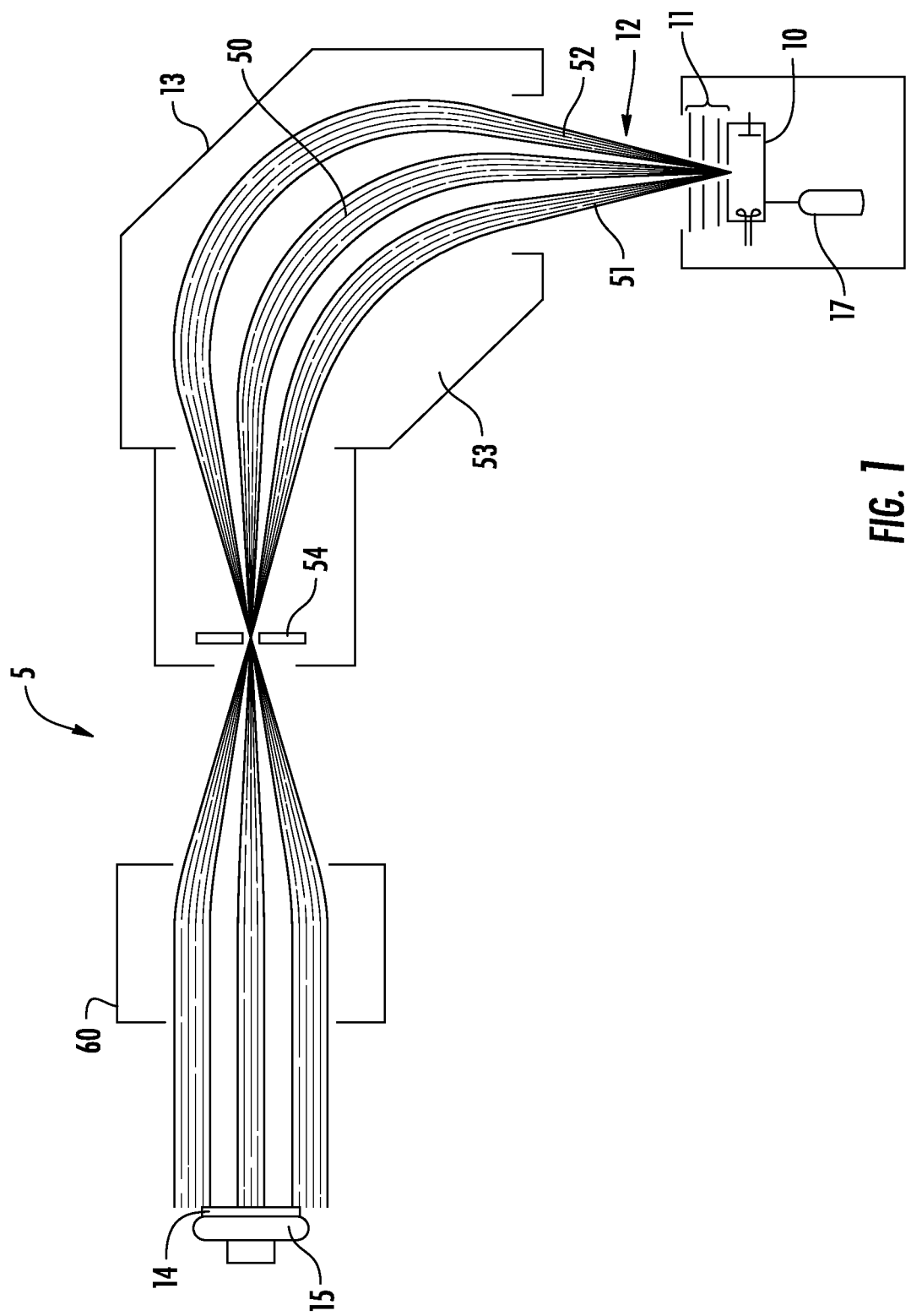
FIG. 1 is a schematic view of an ion implanter according to embodiments of the disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so the present disclosure will be thorough and complete, and will fully convey the scope of the subject matter to those skilled in the art. In the drawings, like numbers refer to like elements throughout.

Embodiments herein provide novel optical gratings wherein trench depth of the grating vs. position in more than one dimension is varied to achieve multiple aspects of grating performance. Embodiments herein further provide improved systems for ion beam etching (IBE), reactive ion beam etching (RIBE), and chemically assisted ion beam etching (CAIBE). In some embodiments, a system may include an ion source with one or more beamlets drawn from apertures. After extraction, the beamlets may pass through a deflection system, such as a pair of deflector plates or quadrupoles, producing a time varying beam direction as a frequency faster than mechanical motion of a substrate moving in a scan path at an angle relative to the beam direction. A reference plane, as used herein, may be defined as the plane including the undeflected beam direction and the normal to the substrate surface. The fast deflection may be along the normal to the reference plane, and the long direction of the grooves is to be along the normal to the reference plane. Furthermore, the substrate scan velocity can be varied vs. substrate position, and the fast deflection can be varied vs. position along the groove in order to create an arbitrary complex pattern of etch depths as desired by the grating designer.

Referring to FIG. 1, an ion implanter apparatus 5 (hereinafter "apparatus") according to embodiments of the present disclosure will be described. As shown, the apparatus 5 may include an ion source 10 with an extraction assembly 11, directing an ion beam 12 through an ion mass selector 13 to impinge on a substrate 14 mounted on a target substrate holder 15. As known, the above elements of the apparatus 5 may be housed in a vacuum housing, illustrated in part. The vacuum housing may be evacuated by a vacuum pump.

In exemplary embodiments, the substrate 14 is an optical grating layer including optically transparent material, including, yet not limited to, silicon oxide, silicon nitride, glass, or other material. In some embodiments, the optical grating layer is formed atop an etch stop layer. The etch stop layer may be an optically transparent material and may have a thickness of 10 nm to 100 nm.

The ion source 10 may be any known ion source such as a Freeman source or a Bernas source. The ion source 10 may include an arc chamber receiving a supply of atoms or molecules containing the element, including ions directed to the target substrate 14. The molecules may be supplied to the arc chamber in gaseous or vapor form, e.g. from a gas bottle 17.

The extraction assembly 11 may include a number of electrodes located proximate a front face of the arc chamber of the ion source 10 so as to extract ions from the arc chamber through an exit aperture in the front face.

In various embodiments, the ion implanter apparatus 5 may be configured to deliver ion beams for "low" energy or "medium" energy ion implantation, such as a voltage range of 1 kV to 300 kV, corresponding to an implant energy range of 1 keV to 300 keV for singly charged ions. As discussed below, the scanning of an ion beam provided to the substrate 14 may be adjusted depending upon current measurements being made for a given scanned ion beam.

By way of reference, known ion implanters configured for non-uniform ion implantation may deliver scanned spot beams to a substrate where a waveform is applied to generate a scan signal. The waveform may have multiple scan segments representing different scan rates to be applied to different portions of a substrate. For example, more than a dozen scan segments may be provided for a same scan line. To cover a substrate over a target area with the scanned spot beam, a substrate may be scanned along the Y-direction while a scan waveform is applied to scan the ion beam for a plurality of scans along the X-direction. In some instances multiple different waveforms may be generated to apply multiple different non-uniform scans across a substrate, generating a target pattern of non-uniform ion implantation.

Figure 2:
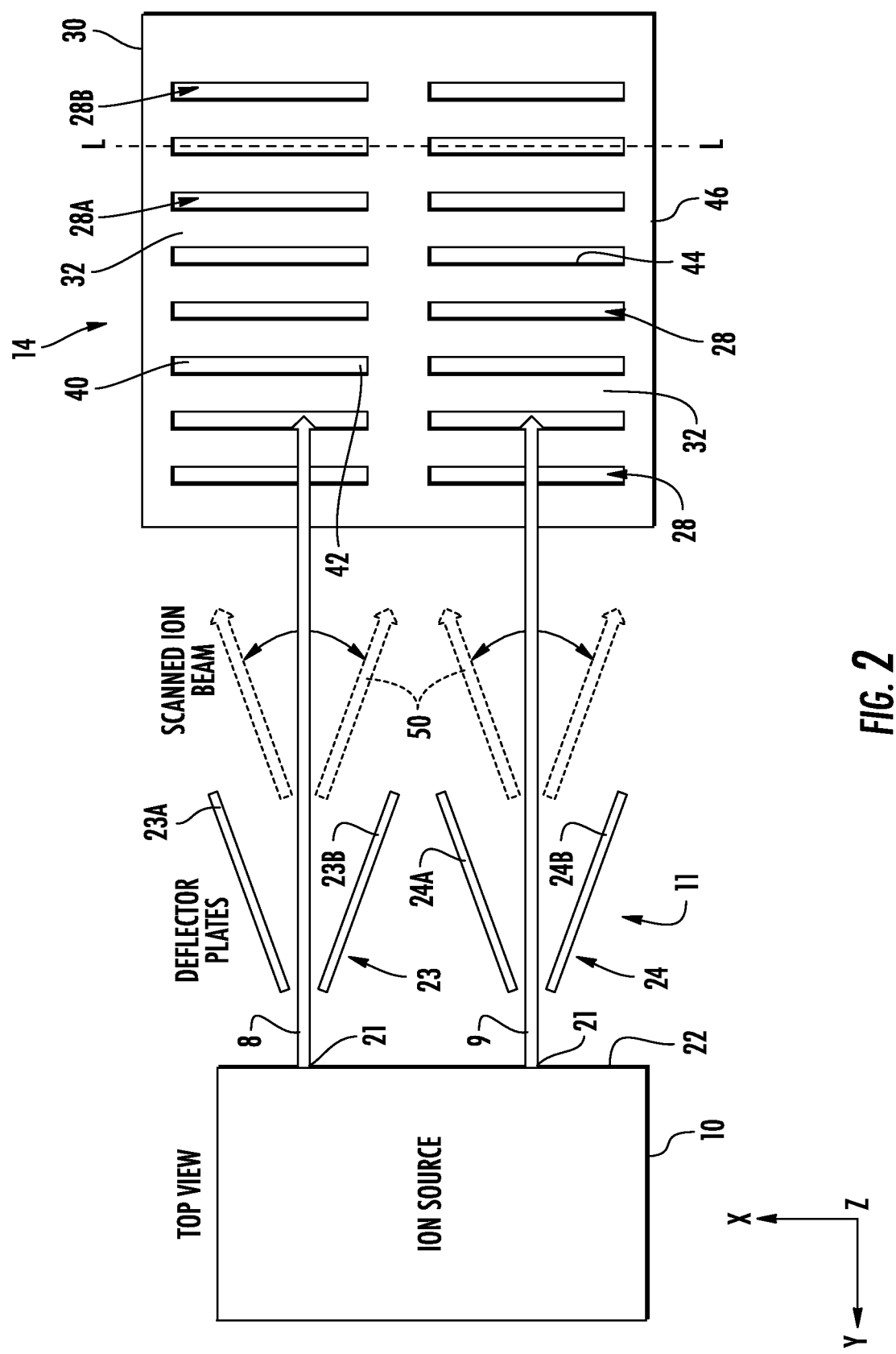
FIG. 2 depicts a top view of an optical grating and ion source according to embodiments of the disclosure.
Figure 3:
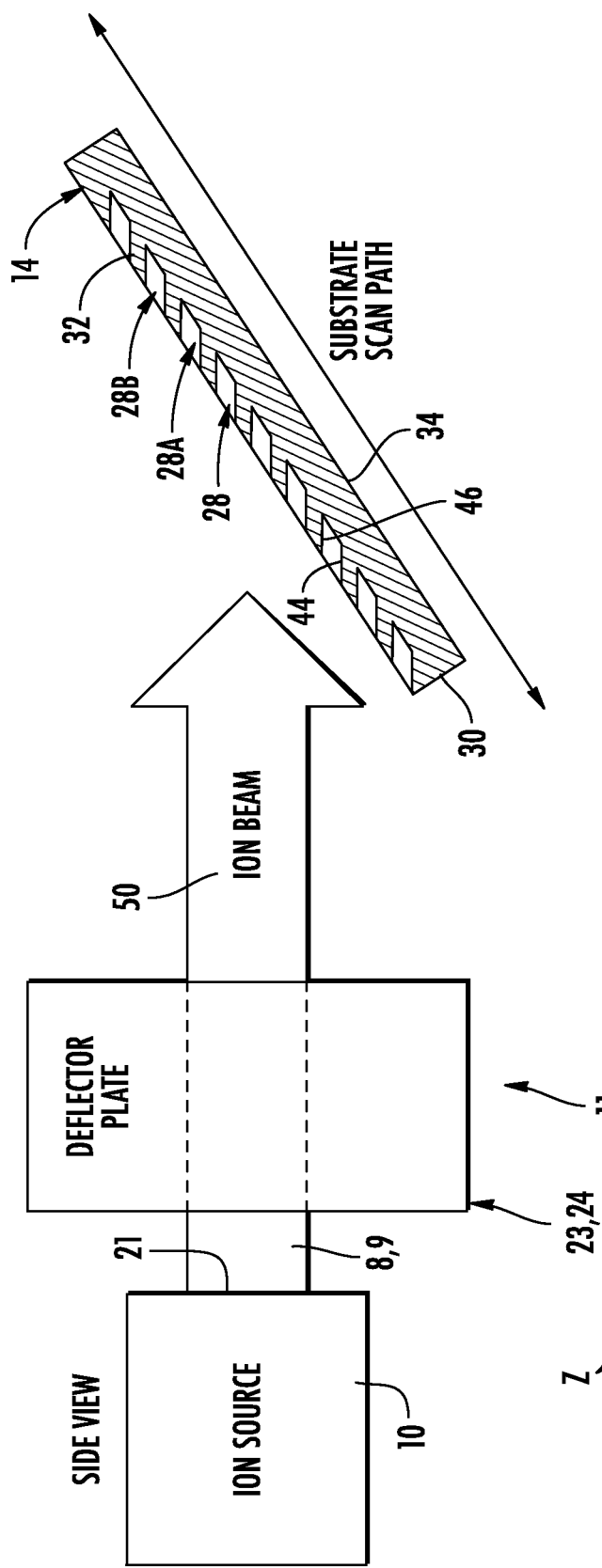
FIG. 3 depicts a side view of the optical grating and ion source of FIG. 2 according to embodiments of the present disclosure.

Referring to FIGS. 2-3, the ion source 10 and extraction assembly 11 according to embodiments of the present disclosure will be described in greater detail. Ions formed in the arc chamber are extracted from the ion source 10 through one or more exit apertures 21 in a front face 22 of the ion source 10. The front face 22 of the ion source 10 may form a first apertured electrode at the potential of the ion source 10. As shown, the ion source 10 may generate a first ion beam 8 and a second ion beam 9. In exemplary embodiments, each of the first and second ion beams 8, 9 are scanned angled reactive ion beams. Although two ion beams 8, 9 are shown, one will appreciate a greater or lesser number of ion beams may be produced by the ion source 10 in various other embodiments.

The extraction assembly 11 is illustrated as having a first electrode 23 in the form of a first pair of deflector plates 23A-23B receiving the first ion beam 8, and a second electrode 24 in the form of a second pair of deflector plates 24A-24B receiving the second ion beam 9. In other embodiments, the first and second electrodes 23, 24 may comprise a lone electrically conductive plate having an aperture through the plate to allow the ion beam emerging from the ion source 10 to pass therethrough. In the embodiment shown, the first pair of deflector plates 23A-23B and the second pair of deflector plates 24A-24B may each include electrically separate, i.e., not electrically connected, first and second parts located on opposite sides of the ion beams 8 and 9, respectively. Although non-limiting, for a beam of positive ions, the ion source 10 may be maintained by a voltage supply at a positive voltage relative to ground. The first and second electrodes 23, 24 each form a deflection lens, wherein the electrically separate first and second parts can be held at different voltages to produce a transverse electric field component across the ion beam. The transverse electric field can deflect the ion beam emerging from the ion source 10, as shown.

Although not shown, the extraction assembly 11 may include one or more additional electrodes in various embodiments. For example, the extraction assembly 11 may include at least one ground electrode (not shown) positioned downstream of each of the first and second electrodes 23, 24. The ground electrode may be a lone electrically conductive plate having an aperture therethrough to allow the ion beams 8, 9 (respectively) emerging from the ion source 10 to pass through. The ground electrode may restrict the penetration of the electric fields between the ground electrode and the ion source 10 into the region to the right (i.e., downstream) of the ground electrode.

The scanned ion beams 8, 9 are used to etch a plurality of trenches 28 in the substrate, thus forming an optical grating 30. The optical grating 30 may include a plurality of angled components/structures 32 disposed at a non-zero angle of inclination with respect to a perpendicular to a plane 34 (FIG. 3) of the substrate 14. The angled structures 32 may be formed by suitable etch processes, such as an angled reactive ion etch, to manufacture the angled structures 32 with unique locations, shapes, three dimensional orientations, etc. The angled reactive ion etch may be performed by a reactive ion beam 50 of the first and second ion beams 8 and 9, wherein the substrate 14 may be scanned along a scan direction with respect to the reactive ion beam 50. In one non-limiting embodiment, the reactive ion beam 50 is a scanned spot beam.

In some embodiments, the depth of the trenches 28 may vary, e.g., between a first lengthwise end 40 and a second lengthwise end 42. Trench depth variation may be accomplished by varying the scanning of the reactive ion beam 50. Furthermore, the depth of the trenches 28 may vary between a first side 44 and a second side 46. As shown, the first side 44 and the second side 46 may be parallel to a lengthwise axis L-L. In yet other embodiments, the depth of different trenches may be different from one another. For example, a first trench 28A may have a different depth than a second trench 28B. As shown, the second trench 28B may be positioned transverse to the first trench 28A, i.e., adjacent to and positioned/oriented normal to the lengthwise axis L-L of the first trench 28A along the y-direction. In some embodiments, the duty cycle of the reactive ion beam 50 and/or the scan velocity of the substrate 14 may be varied.

Figure 4:
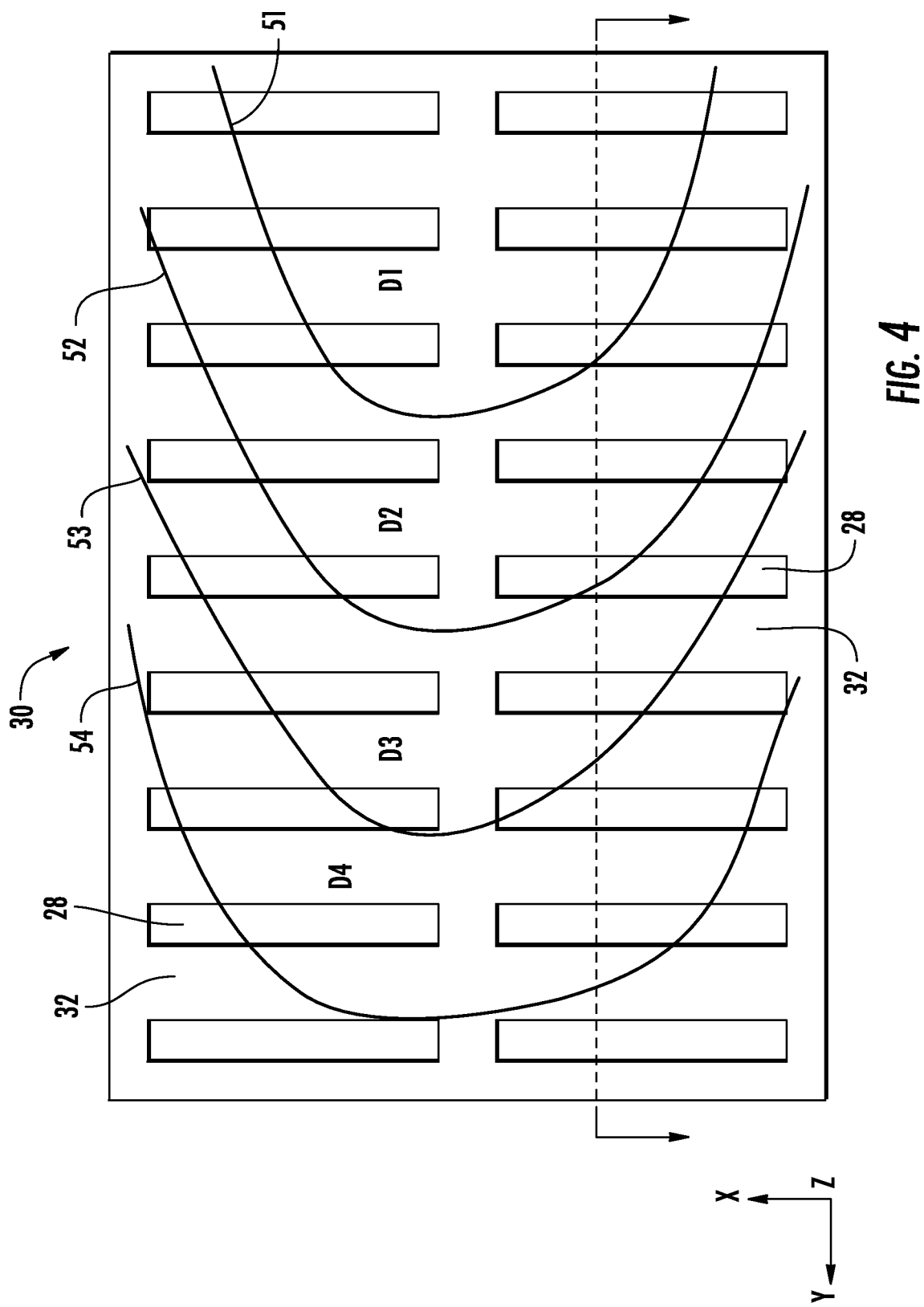
FIG. 4 depicts a top view of an example optical grating according to embodiments of the disclosure.
Figure 5:
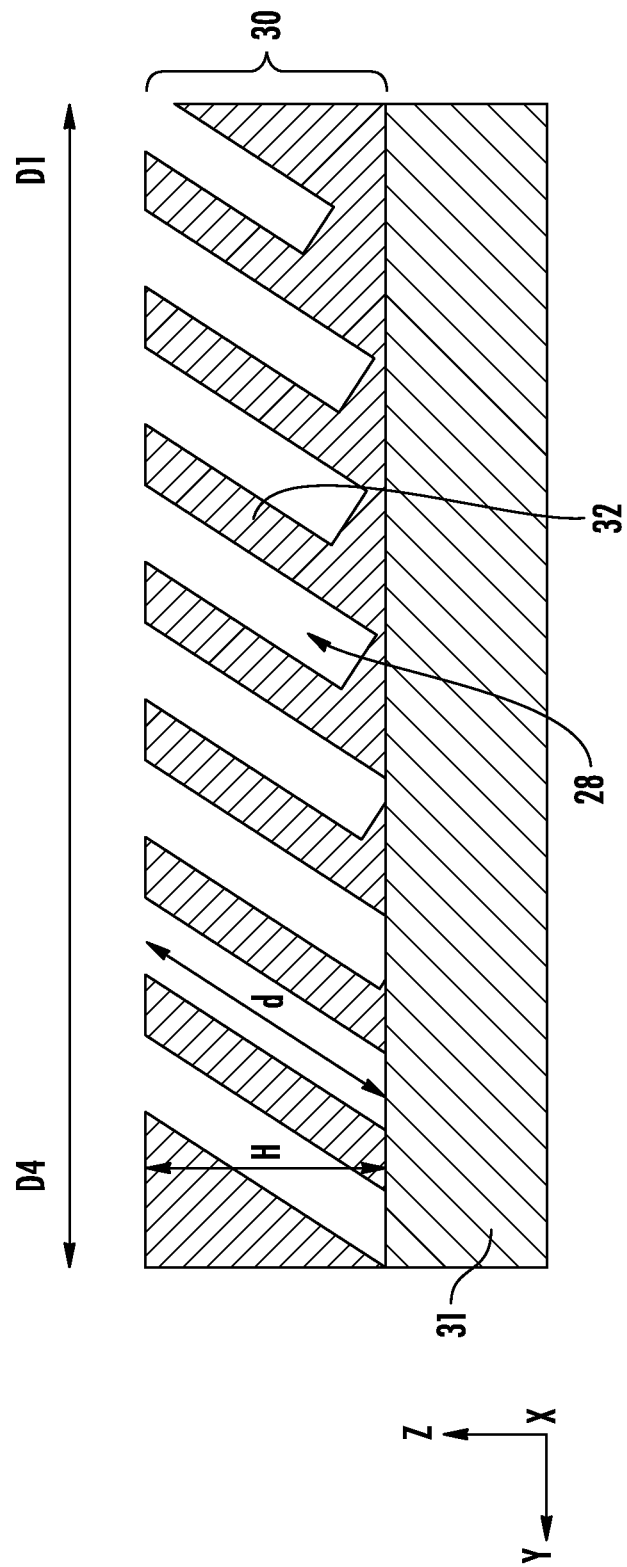
FIG. 5 shows a side cross-sectional view of angled structures formed in an optical grating layer in accordance with embodiments of the present disclosure.

Turning now to FIGS. 4-5, the optical grating 30 according to embodiments of the present disclosure will be described in greater detail. In the non-limiting embodiment shown, the optical grating 30 may be a layer formed atop a substrate 31 (FIG. 5). As shown, the plurality of angled components/structures 32 are separated by trenches 28. In the non-limiting embodiment shown, an arbitrary depth pattern is provided. For example, in a first zone or band 51, the trenches 28 may have a first depth D1. In a second zone or band 52, the trenches 28 may have a second depth D2. In a third zone or band 53, the trenches may have a third depth D3, and so on. Although non-limiting, D3>D2>D1.

As shown, a same/lone trench 28 is capable of having two or more different depths. Varying trench depth of the optical grating 30 vs. position in more than one dimension (e.g., x and y directions) may achieve multiple aspects of grating performance. For example, the optical grating 30 may be made smaller, thinner, and/or with better image quality. As mentioned above, depth variation along the length of the trenches 28 may be done by varying the fast scan of the ion beam. For example, to achieve a non-uniform ion beam process, at least one waveform may be applied to the ion beam having multiple scan segments where the application of different scan segments of the waveform generates different fast scan speeds. These different scan segments may result in different ion doses being received as a function of position on the optical grating 30, since the ion beam may then scan over different segments of the substrate at different speeds while the beam current remains constant. Depth variation transverse to the trenches 28 may be done either by varying the mechanical scan velocity of the substrate or the duty cycle of the ion beam. For instance, a slower fast scan speed will increase the ion dose at a particular position and cause an increase in the amount of material removed and therefore a greater etch depth. Similarly, increasing the duty cycle or reducing the slow scan velocity will increase the ion dose at a particular position and again cause an increase in the amount of material removed and therefore a greater etch depth.

Figure 6:
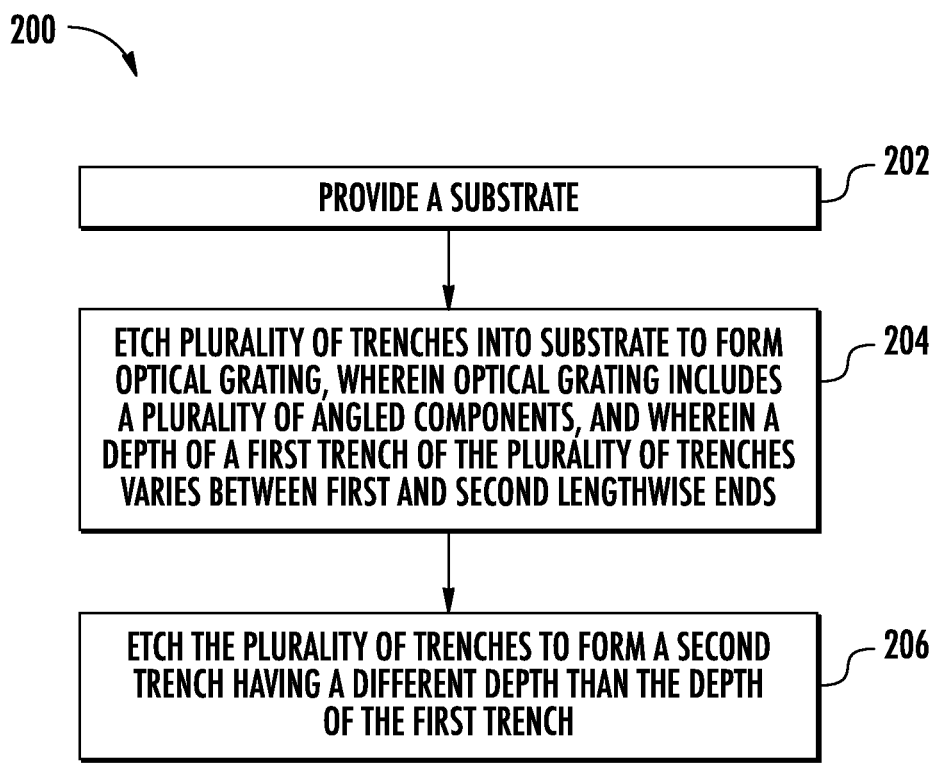
FIG. 6 depicts a process flow in according to embodiments of the disclosure.

Turning now to FIG. 6, a method 200 according to embodiments of the present disclosure will be described in greater detail. Specifically, at block 202, a substrate is provided. In some embodiments, the substrate is an optical grating layer made from an optically transparent material, including, yet not limited to, silicon oxide, silicon nitride, glass, or other material. In some embodiments, the optical grating layer is formed atop an etch stop layer. The etch stop layer may be an optically transparent material and may have a thickness of 10 nm to 100 nm At block 204, the method 200 may include etching a plurality of trenches in the substrate to form an optical grating, wherein the optical grating includes a plurality of angled components, and wherein a depth of a first trench of the plurality of trenches varies between a first lengthwise end of the first trench and a second lengthwise end of the first trench. In some embodiments, the depth of the first trench varies between a first side of the first trench and a second side of the first trench, wherein the first and second sides are parallel to a lengthwise axis of the first trench. In some embodiments, the plurality of angled components are disposed at a non-zero angle of inclination with respect to a perpendicular to a plane of the substrate. In some embodiments, the depth of the first trench of the plurality of trenches varies between a first side of the first trench and a second side of the first trench, wherein the first and second sides are parallel to the lengthwise axis. In some embodiments, the etching comprises performing an angled reactive ion etch. The angled reactive ion etch may be performed by a reactive ion beam, wherein the substrate is scanned along a scan direction with respect to the reactive ion beam.

In some embodiments, the method 200 further includes varying the scanning of the reactive ion beam to vary the depth of a first trench of the plurality of trenches between the first lengthwise end of the first trench and the second lengthwise end of the first trench. In some embodiments, the method 200 further includes varying at least one of the following to achieve depth variation transverse to the lengthwise axis of one or more trenches: a duty cycle of the reactive ion beam, and a scan velocity of the substrate.

At block 206, the method 200 may optionally include etching the plurality of trenches to form a second trench having a different depth than the depth of the first trench. In some embodiments, the second trench is positioned/located transverse to a lengthwise axis extending between first and second lengthwise ends of the first trench.

Embodiments herein may be computer implemented. For example, the processing ion implanter apparatus 5 may include a computer processor to perform logic operations, computational tasks, control functions, etc. In some embodiments, the computer processor may be a component of a processor. The computer processor may include one or more subsystems, components, modules, and/or other processors, and may include various logic components operable using a clock signal to latch data, advance logic states, synchronize computations and logic operations, and/or provide other timing functions. During operation, the computer processor may receive signals transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, the computer processor executes computer program instructions or code stored in a memory unit and/or storage system. For example, when executing computer program instructions, the computer processor causes the ion implanter apparatus 5 to receive inputs, such as any of the processing parameters discussed herein, and provide, from the computer processor, the outputs. In some embodiments, the computer processor executes and carries out the processing recipe to form the optical grating 30.

While executing computer program code, the computer processor can read and/or write data to/from the memory unit and/or the storage system. The storage system may comprise VCRs, DVRs, RAID arrays, USB hard drives, optical disk recorders, flash storage devices, and/or any other data processing and storage elements for storing and/or processing data. The processing apparatus could also include I/O interfaces communicating with one or more hardware components of computer infrastructure to enable a user to interact with the processing apparatus (e.g., a keyboard, a display, camera, etc.).

As used herein, an element or operation recited in the singular and proceeded with the word "a" or "an" are understood as possibly including plural elements or operations, except as otherwise indicated. Furthermore, references to "one embodiment" or "some embodiments" of the present disclosure may be interpreted as including the existence of additional embodiments also incorporating the recited features.

Furthermore, the terms "approximate" or "approximately," can be used interchangeably in some embodiments, and can be described using any relative measures acceptable by one of skill. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

In sum, various embodiments described herein provide approaches for forming optical gratings having varied depths. Manufacturing may be accomplished by direct application of the angled ions on the substrate, and/or on a mask used to transfer the pattern to the substrate of interest. A first technical advantage of the present embodiments includes varying depth of the trenches of the optical grating in more than one dimension along a plane defined by the top surface of the optical grating to achieve multiple aspects of grating performance. A second technical advantage of the present embodiments is the use of less intrusive optical depth detection techniques, resulting in less downtime.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A method of forming an optical grating component, comprising:
providing a substrate; and
etching, using a reactive ion beam traversing the substrate along a beam direction, a plurality of trenches into the substrate to form an optical grating, wherein a depth of a first trench of the plurality of trenches varies between at least one of the following: a first lengthwise end of the first trench and a second lengthwise end of the first trench, and between a first side of the first trench and a second side of the first trench, wherein the reactive ion beam is scanned normal to the beam direction, wherein the depth of the first trench is varied between the first and second lengthwise ends by varying a fast scan of the reactive ion beam as the reactive ion beam is scanned between the first and second lengthwise ends, and wherein the depth of the first trench is varied between the first and second sides by varying a duty cycle of the reactive ion beam as the reactive ion beam passes between the first and second sides or by varying a scan velocity of the substrate as the reactive ion beam passes between the first and second sides.

2. The method of claim 1, further comprising etching the plurality of trenches to form a second trench having a different depth than the depth of the first trench.

3. The method of claim 2, wherein the second trench is positioned transverse to a lengthwise axis extending between the first and second lengthwise ends of the first trench.

4. The method of claim 1, wherein the etching comprises performing an angled reactive ion etch.

5. The method of claim 4, wherein the angled reactive ion etch is performed by the reactive ion beam.

6. The method of claim 5, further comprising delivering the reactive ion beam through a pair of deflector plates to scan the reactive ion beam normal to the beam direction.

7. The method of claim 1, wherein the plurality of trenches is disposed at a non-zero angle of inclination with respect to a perpendicular to a plane of the substrate.

8. A method of forming an optical grating component, comprising:
providing a substrate, wherein the substrate is an optical grating layer; and
etching, using a reactive ion beam traversing the substrate along a beam direction, a plurality of trenches into the substrate to form an optical grating, wherein a depth of a first trench of the plurality of trenches varies between at least one of the following: a first lengthwise end of the first trench and a second lengthwise end of the first trench, and between a first side of the first trench and a second side of the first trench, wherein the reactive ion beam is scanned normal to the beam direction, wherein the depth of the first trench is varied between the first and second lengthwise ends by varying a fast scan of the reactive ion beam as the reactive ion beam is scanned between the first and second lengthwise ends, and wherein the depth of the first trench is varied between the first and second sides by varying a duty cycle of the reactive ion beam as the reactive ion beam passes between the first and second sides or by varying a scan velocity of the substrate as the reactive ion beam passes between the first and second sides.

9. The method of claim 8, further comprising etching the plurality of trenches to form a second trench having a different depth than the depth of the first trench, wherein the second trench is positioned transverse to a lengthwise axis extending between the first and second lengthwise ends of the first trench.

10. The method of claim 8, wherein the etching comprises performing an angled reactive ion etch, and wherein the angled reactive ion etch is performed by the reactive ion beam.

11. The method of claim 8, wherein the plurality of trenches is formed at a non-zero angle of inclination with respect to a perpendicular to a plane of the substrate.

* * * * *